United States Patent
Xie et al.

(10) Patent No.: US 12,351,142 B2
(45) Date of Patent: Jul. 8, 2025

(54) SENSOR ASSEMBLY FOR A VEHICLE AND MULTI-CIRCUIT BRAKING SYSTEM HAVING REDUNDANT CONTROL AND ROTATION RATE INFORMATION COMMUNICATION

(71) Applicant: Robert Bosch GmbH, Stuttgart (DE)

(72) Inventors: Fei Xie, Gemmrigheim (DE); Bernd Stoehr, Sachsenheim (DE); Stefan Hoess, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/754,929

(22) PCT Filed: Oct. 22, 2020

(86) PCT No.: PCT/EP2020/079722
§ 371 (c)(1),
(2) Date: Apr. 15, 2022

(87) PCT Pub. No.: WO2021/089334
PCT Pub. Date: May 14, 2021

(65) Prior Publication Data
US 2024/0140385 A1    May 2, 2024

(30) Foreign Application Priority Data

Nov. 6, 2019 (DE) .................. 10 2019 217 140.0
May 12, 2020 (DE) .................. 10 2020 205 961.6

(51) Int. Cl.
*B60T 13/66*   (2006.01)
*B60T 8/171*   (2006.01)
(Continued)

(52) U.S. Cl.
CPC ............ *B60T 13/662* (2013.01); *B60T 8/171* (2013.01); *B60T 8/17551* (2013.01); *B60T 8/88* (2013.01); *B60T 8/76* (2013.01); *B60T 13/588* (2013.01)

(58) Field of Classification Search
CPC .............................. B60T 13/662; B60T 8/171
See application file for complete search history.

(56) References Cited

U.S. PATENT DOCUMENTS 4,778,025 A * 10/1988 Sakaguchi ............. B60K 28/16
180/197
7,810,889 B2 * 10/2010 Anstey .................... B60T 13/66
303/7

(Continued)

FOREIGN PATENT DOCUMENTS

CN        105292086 A        2/2016
CN        105916746 A        8/2016
(Continued)

OTHER PUBLICATIONS

International Search Report corresponding to PCT Application No. PCT/EP2020/079722, mailed Jan. 28, 2021 (German and English language document) (6 pages).

*Primary Examiner* — Jess Whittington
(74) *Attorney, Agent, or Firm* — Maginot, Moore & Beck LLP

(57) ABSTRACT

The disclosure relates to a sensor assembly for a vehicle, comprising: a speed sensor for each vehicle wheel that detects an rpm-dependent and/or rotational-speed-dependent physical variable, which is used to ascertain speed information; a primary control unit, which analyses the speed information to perform first braking functions; and a secondary control unit, which analyses the speed information to perform second braking functions. A control unit is positioned close to each of the vehicle wheels, and is (Continued)

connected to the speed sensor associated with the corresponding wheel and receives a sensor signal and determines the speed information for the corresponding vehicle wheel, the primary control device and a further control device receiving the speed information for analysis in real time, and the control devices making the speed information available in the form of first sensor data to a central network over a databus for distribution in the vehicle.

15 Claims, 2 Drawing Sheets

(51) Int. Cl.
*B60T 8/1755* (2006.01)
*B60T 8/88* (2006.01)
*B60T 8/76* (2006.01)
*B60T 13/58* (2006.01)

(56) References Cited

U.S. PATENT DOCUMENTS

| | | | | |
|---|---|---|---|---|
| 2006/0108864 | A1* | 5/2006 | Evans | B60T 8/1703 |
| | | | | 701/70 |
| 2006/0212135 | A1* | 9/2006 | Degoul | B60T 8/3255 |
| | | | | 700/20 |
| 2008/0271541 | A1* | 11/2008 | Neuman | G07C 5/085 |
| | | | | 73/767 |
| 2008/0296106 | A1* | 12/2008 | Nilsson | B60T 8/345 |
| | | | | 701/115 |
| 2017/0335912 | A1 | 11/2017 | Koh et al. | |
| 2019/0054909 | A1* | 2/2019 | Shah | B60T 8/00 |
| 2020/0148218 | A1* | 5/2020 | Huang | G06F 11/165 |
| 2020/0193833 | A1* | 6/2020 | Matsunaga | G05D 1/0212 |
| 2020/0217870 | A1* | 7/2020 | Rince | G01P 3/489 |
| 2022/0118960 | A1* | 4/2022 | Häuslschmid | B60T 8/171 |

FOREIGN PATENT DOCUMENTS

| | | |
|---|---|---|
| CN | 108688679 A | 10/2018 |
| DE | 103 48 392 A1 | 5/2005 |
| DE | 10 2014 220 441 A1 | 7/2015 |
| DE | 10 2015 110 965 A1 | 1/2016 |
| DE | 10 2015 202 335 A1 | 8/2016 |
| DE | 10 2018 204 615 A1 | 10/2019 |
| EP | 1 695 886 A1 | 8/2006 |

* cited by examiner

SENSOR ASSEMBLY FOR A VEHICLE AND MULTI-CIRCUIT BRAKING SYSTEM HAVING REDUNDANT CONTROL AND ROTATION RATE INFORMATION COMMUNICATION

This application is a 35 U.S.C. § 371 National Stage Application of PCT/EP2020/079722, filed on Oct. 22, 2020, which claims the benefit of priority to Serial No. DE 10 2019 217 140.0, filed on Nov. 6, 2019 in Germany, and which claims the benefit of priority to Serial No. DE 10 2020 205 961.6, filed on May 12, 2020 in Germany the disclosures of which are incorporated herein by reference in their entirety.

The disclosure relates to a sensor assembly for a vehicle. The disclosure also relates to a corresponding multi-circuit braking system having such a sensor assembly.

BACKGROUND

For highly automated or autonomous driving and for partially automated or partially autonomous driving functions, redundancies are typically required so that the availability of sensors and functions is guaranteed even in many fault cases. Therefore, a brake system with a primary and secondary stabilization of the vehicle is typically used. Specifically, two independent braking units or brake control systems are typically used for braking. Both should ideally receive rotation rate information from rotation rate sensors, each assigned to a vehicle wheel, with a high level of availability. In modern solutions, the rotation rate sensors are directly connected point-to-point to a primary control unit. In a two-box system approach, such as an ESP system as the primary system and an electromechanical or other electric brake booster as the secondary system, or an integrated brake system (IPB) as the primary system and a redundant brake unit (RBU) as a secondary system, the sensor signals from the speed sensors are either looped through to the secondary control unit by the primary control unit, which requires additional complexity and costs and does not cover all fault cases, or else the rotation rate sensors are switched over between the primary control unit and the secondary control unit via a switching device in the event of a fault. Another known solution provides eight rotation rate sensors, four of which are directly connected to the primary control unit and four to the secondary control unit. As a result of this partition, two rotation rate sensors are installed on each wheel so that the systems can stabilize the vehicle in a redundant manner. This means that a total of eight rotation rate sensors per vehicle and the associated duplicated costs are expended on sensors and wiring.

DE 10 2015 202 335 A1, for example, discloses a multi-circuit braking system for a vehicle, having an electromechanical brake booster, at least one power-operated hydraulic component, a first sensor element, which provides at least one first sensor variable relating to the rotation rate and/or the rotational speed of the vehicle wheel to at least one evaluation and/or control device of the vehicle, and a second sensor element, which provides at least one second sensor variable relating to the rotation rate and/or rotational speed of the same vehicle wheel to the at least one evaluation and/or control device. In addition, the first sensor element, together with the electromechanical brake booster, is connected to a first power supply network at least partially implemented in the braking system, and the second sensor element, together with the at least one power-operated hydraulic component, is connected to a second power supply network, at least partially implemented in the braking system.

For example, DE 10 2018 204 615 A1 discloses a sensor assembly of the generic type having a sensor element and at least two control units, each of which has an evaluation and control unit and a power source, wherein in a first control unit a first evaluation and control unit is connected to a first power source and in a second control unit a second evaluation and control unit is connected to a second power source. The at least two control units and the sensor element are interconnected via at least one separate interconnection module, wherein the respective interconnection module connects a first terminal of the associated sensor element to the first power source and/or to the second power source. A second terminal of the sensor element is connected to ground. In this case, a sensor current flowing through the sensor element is modulated at least with information about a detected measurement variable and is evaluated by the first evaluation and control unit and/or the second evaluation and control unit. In the event of a failure of the connected power source, the interconnection module connects the first terminal of the sensor element to the other power source.

SUMMARY

The sensor assembly for a vehicle and the multi-circuit braking system, in particular for a highly automated or autonomous vehicle, having such a sensor assembly, each have the advantage that a redundant rotation rate sensor design can be implemented with standard rotation rate sensors without an interconnection device. In this case, the rotation rate information is available at least to the primary control unit and to at least one additional control unit in real time. This means that if the primary control unit fails, there is no resulting latency time for the transfer of the rotation rate information, since the secondary control unit can also be connected directly to the control units near the wheels as an additional control unit. In addition, the rotation rate information is also available via a central network to additional control units, for which a longer latency time for transferring the rotation rate information is possible.

Embodiments of the sensor assembly according to the disclosure for a vehicle advantageously allow the use of standard rotation rate sensors and of conventional control units as the primary control unit and the secondary control unit without additional switching devices. In addition, the rotation rate information of the individual rotation rate sensors can also be made available to other control units in the vehicle, which also require the rotation rate information in real time, via a direct connection to the control units near the wheels.

Embodiments of the present disclosure constitute a sensor assembly for a vehicle, having a rotation rate sensor for each vehicle wheel, which sensors each detect at least one rpm-dependent and/or rotation-speed-dependent physical variable of the corresponding vehicle wheel, wherein the at least one rpm-dependent and/or rotation-speed-dependent physical variable can be used to ascertain rotation rate information for the corresponding vehicle wheel, a primary control unit, which analyses the rotation rate information ascertained from the individual vehicle wheels to perform first braking functions of the vehicle, and a secondary control unit, which analyses the rotation rate information ascertained from the individual vehicle wheels to perform second braking functions of the vehicle. In each case, a control unit located near the wheel is arranged in the region of the vehicle wheel, which control unit is directly connected to the associated rotation rate sensor of the corresponding vehicle wheel and receives a sensor signal from the rotation rate sensor and ascertains the rotation rate information for the corresponding vehicle wheel from the sensor signal. At least the primary control unit and at least one additional control unit receive the ascertained rotation rate information for analysis in real time, wherein the control units located near the wheel provide the rotation rate information ascertained over a databus to a central network as first sensor data for distribution in the vehicle.

In addition, a multi-circuit braking system is proposed, in particular for a highly automated or autonomous vehicle, having a plurality of wheel brakes each arranged on a vehicle wheel, having such a sensor assembly which detects at least one rpm-dependent and/or rotation-speed-dependent physical variable of the vehicle wheels, a primary control unit, which analyses the rotation rate information ascertained from the individual vehicle wheels in order to perform first braking functions of the vehicle, and a secondary control unit which evaluates the rotation rate information ascertained from the individual vehicle wheels in order to perform second braking functions of the vehicle.

The primary control unit and the secondary control unit in the present case can be understood to mean an electrical device which processes and/or evaluates detected sensor signals. For this purpose, the control unit can comprise at least one evaluation and control unit for processing signals or data, at least one storage unit for storing signals or data, at least one interface to a sensor or an actuator for reading in sensor signals from the sensor or for outputting control signals to the actuator, and/or at least one communication interface for reading in or outputting data that is embedded in a communication protocol. In this case, the actuators are designed, for example, as solenoid valves or as pressure generators, which can be controlled accordingly by the control unit. The at least one interface can be implemented in hardware and/or software. In the case of a hardware-based design, the interfaces can be, for example, part of a so-called system circuit, which includes the full range of functions of the control unit. Such a system circuit is preferably designed as an application-specific integrated circuit (ASIC). For example, the evaluation and control unit can be implemented as an ASIC. It is also possible, however, that the interfaces are dedicated integrated circuits, or at least in part consist of discrete components. In the case of a software-based design, the interfaces can be software modules which exist, for example, on a microcontroller in addition to other software modules. The computing unit can be, for example, a signal processor, a microcontroller or the like, and the storage unit can be a flash memory, an EEPROM, or a magnetic storage unit. Also advantageous is a computer program product with program code, which is stored on a machine-readable medium such as a semiconductor memory, a hard drive or an optical memory, and is used to perform the analysis when the program is executed by the analysis and control unit. The two control units can perform various braking functions, such as ABS, ESP, TCS and/or hill-hold functions (ABS: Anti-lock braking system, ESP: Electronic stability program, TCS: Traction control system), in conjunction with a primary or secondary actuator system. In this case, the two control units can perform different braking functions during normal operation. In the event of a failure of one of the two control units, it can be provided that the other control unit assumes at least some of the braking functions of the failed control unit in order to form an appropriate fallback level.

The primary and secondary actuator systems can be understood in this case as a hydraulic and/or electromechanical assembly, via which appropriate open-loop and/or closed-loop control operations for an ABS function (ABS: Anti-lock braking system) or a TCS function (TCS: Traction control system), or an electronic stability program (ESP) can be performed in the braking system for pressure buildup or pressure relief in the wheel brakes. To perform the open-loop and/or closed-loop control operations, the primary actuator system or the secondary actuator system comprises at least one brake pressure generator and a hydraulic valve unit with solenoid valves, which can usually be held in unique positions due to the opposing forces of "magnetic force", "spring force" and "hydraulic force". Accordingly, there are two solenoid valve types "power-off open" and "power-off closed". In addition, bistable solenoid valves are also used, which can be switched between a "power-off open" and a "power-off closed" state, wherein such a bistable solenoid valve remains permanently in the respective operating state until the next switching signal. The brake pressure generator can be operated in particular by muscle force, auxiliary force, and/or external force. "Auxiliary force" means activation by muscle force supported by a servo-assisted braking system.

In the present case, a rotation rate sensor is understood to mean an electrical component which directly or indirectly detects a physical variable or a change in a physical variable in the region of an associated vehicle wheel and preferably converts the variable into an electrical sensor signal. The rotation rate information is preferably determined by scanning a magnetic encoder or a ferromagnetic gear wheel. For example, the magnetic encoder is designed as a measuring encoder ring having a plurality of magnet elements, in particular permanent magnets, evenly distributed over its circumference which have alternating magnetic orientation and form a magnetic pole pair. By means of the rotation rate sensor, the magnetic fields of the magnet elements during a rotation of the measuring encoder ring are detected, wherein depending on the magnetic flux of the respective magnetic field detected, an output current is provided to a control unit by means of a current interface for further use as rotation rate information. The rotation rate sensors can comprise, for example, a Hall-type, GMR, AMR or TMR sensor element (GMR: Giant magnetoresistance, AMR: Anisotropic magnetoresistance, TMR: Tunnel magnetoresistance). Each rotation rate sensor can transmit its rotation rate information as a data protocol, such as an AK-protocol or I-protocol, via the current interface to the corresponding control unit near the wheel. To determine the rotation rate information, the rotation rate sensors detect, for example, zero crossings of magnetic pole pairs, wherein at each magnetic pole pair zero crossing, i.e. a change of sign of the detected magnetic field strength, a so-called "speed pulse" is generated which represents the actual rotation rate information. The AK-protocol comprises the "speed pulse" as rotation rate information and at least one item of additional rotation rate information as a data word with multiple protocol bits. The protocol bits define the data content of the at least one additional item of rotation rate information. The at least one additional item of rotation rate information relates, for example, to rotation direction information, air gap information, temperature information, etc.

The central network in the vehicle can be, for example, a CAN bus system or an Ethernet or a FlexRay. Of course, other suitable networks or a combination of the mentioned networks can also be used in the vehicle to distribute the rotation rate information.

The measures and developments listed in the embodiments enable advantageous improvements of the sensor assembly for a vehicle.

It is particularly advantageous that the individual rotation rate sensors can each be electrically connected to the corresponding control unit near the wheel via a two-wire conductor. Thus, a sensor current flowing through the respective rotation rate sensor can be modulated with information about a detected measurement variable and detected by the associated control unit near the wheel and converted into a voltage signal representing the corresponding rotation rate information. In addition, the control units near the wheel can provide the "speed pulse" representing the actual rotation rate information as a voltage signal, for example, via a point-to-point connection in real time. For example, the point-to-point connection can be implemented as a single-wire conductor and electrically connect the control unit near the wheel to the primary control unit or the at least one additional control unit. In addition, the individual control units near the wheel can provide additional rotation rate information, such as direction of rotation information, air gap information, temperature information, etc., over the databus and the central network for distribution in the vehicle.

In a further advantageous embodiment of the sensor assembly, at least two of the control units near the wheel can be electrically connected to a corresponding actuator of an electric parking brake in order to perform a parking brake function. In this case, the at least two of the control units near the wheel can each generate control signals and output them via the corresponding electrical connection to the corresponding actuator of the electric parking brake. The control of the actuators of the electric parking brake by the control units near the wheel enables the high current-carrying electrical connecting cables between the control unit and the associated actuator to be made shorter compared to the prior art. In addition, it is possible to relieve the primary control unit or the secondary control unit, which in known sensor assemblies control the actuation of the actuators of the electric parking brake. Furthermore, the division of the parking brake function over at least two control units near the wheel enables improved redundancy of the parking brake function, even in highly autonomous or highly automated vehicles.

In a further advantageous embodiment of the sensor assembly, the parking brake function can be activated in the at least two of the control units near the wheel via second sensor data, which can be transferred over the central network and the databus to the at least two of the control units near the wheel. In this case, a manual operating element of the parking brake function can be electrically connected to the primary control unit or to the at least one additional control unit or to the central network. This means that the corresponding component electrically connected to the manual operating element can detect an actuation and generate a corresponding activation signal and output it over the databus to the control units near the wheel. Furthermore, in highly autonomous or highly automated vehicles which are designed without driver intervention, such a manual operating element can be omitted.

In a further advantageous embodiment of the sensor assembly, the at least two of the control units near the wheel can be arranged in the region of the vehicle wheels on a common vehicle axle, preferably a rear axle.

In a further advantageous embodiment of the sensor assembly, the primary control unit and/or the at least one additional control unit can be designed as a control unit near the wheel. This means that the primary control unit is connected, for example, directly to one of the rotation rate sensors and provides its rotation rate information to the other control units in real time. In addition or alternatively, the secondary control unit or another control unit can also be directly connected to one of the rotation rate sensors and provide its rotation rate information to the other control units in real time.

In a further advantageous embodiment of the sensor assembly, the control units near the wheel can be electrically connected to at least one environment sensor which detects at least one accident-relevant physical variable and transmits a corresponding sensor signal to the corresponding control unit near the wheel. These environment sensors, which are designed, for example, as ultrasonic sensors, radar sensors, etc., can preferably be used to determine a distance to objects in the vehicle environment. This distance information can be used in driver assistance systems, for example, such as a parking assistant, a distance warning device, a cruise control system, etc. Therefore, the control units near the wheels can make the sensor signals of the environment sensors available to the central network over the data bus as third sensor data for distribution in the vehicle.

In a further advantageous embodiment of the sensor assembly, the control units can each have a redundant power supply. This means that the transmission of the rotation rate information and the associated vehicle functions can be performed even in the event of failure of one of the power supplies.

In a further advantageous embodiment of the sensor assembly, the at least one additional control unit can be the secondary control unit or a drive control unit, which drives an inverter of an electric drive unit of the vehicle, or a central control unit which calculates motion trajectories.

In a further advantageous embodiment of the sensor assembly, the primary control unit can control an ESP system or an ESP system with a vacuum-independent electro-hydraulic servo-assisted braking system. The secondary control unit can control a vacuum-independent electro-hydraulic servo-assisted braking system or a redundant brake unit.

Exemplary embodiments of the disclosure are shown in the drawing and are explained in more detail in the following description. In the drawing, the same reference numbers denote the same components or elements which perform identical or similar functions.

DETAILED DESCRIPTION

Figure 1:
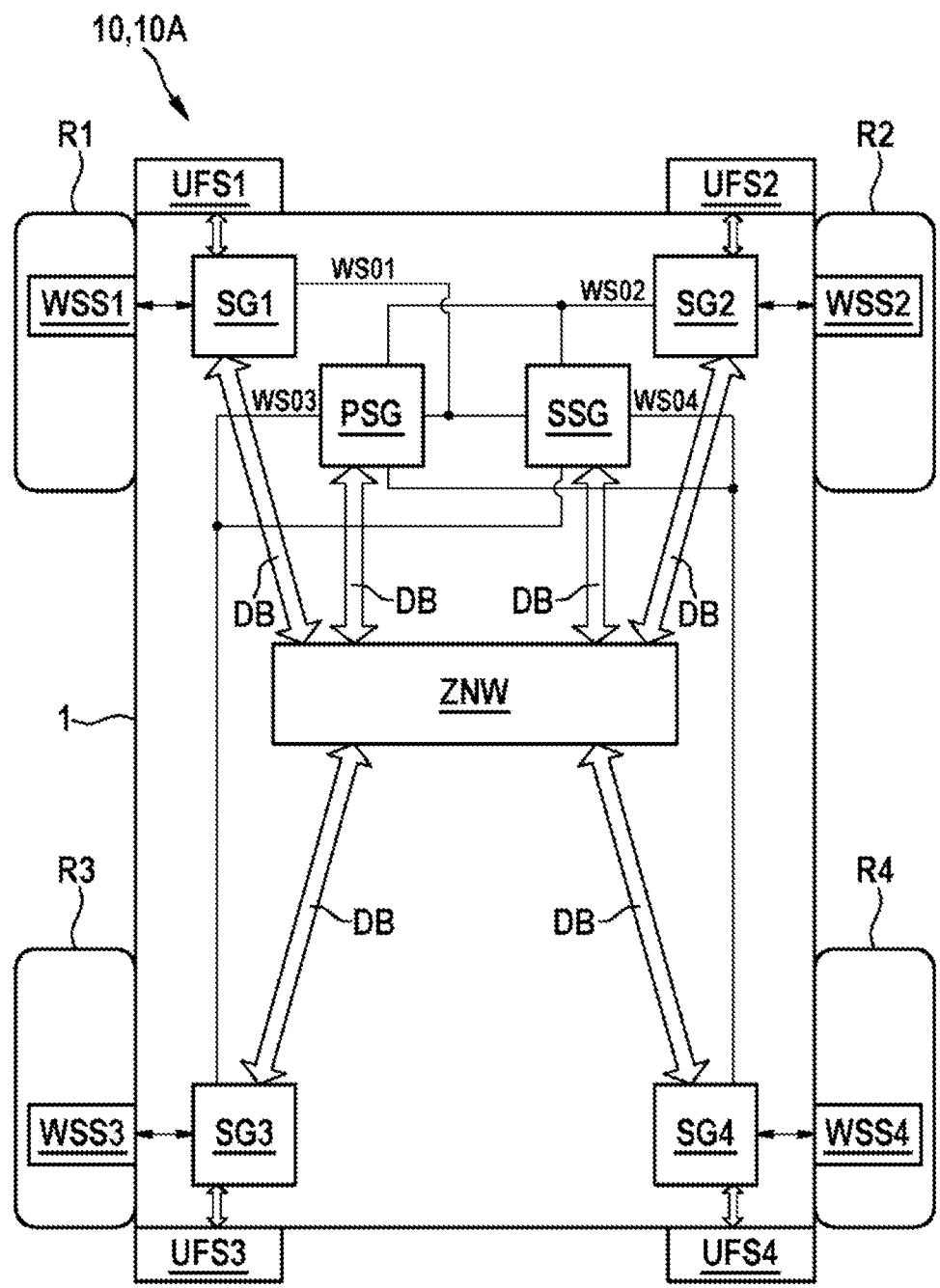
FIG. 1 shows a schematic block diagram of an exemplary embodiment of a sensor assembly according to the disclosure for a vehicle.
Figure 2:
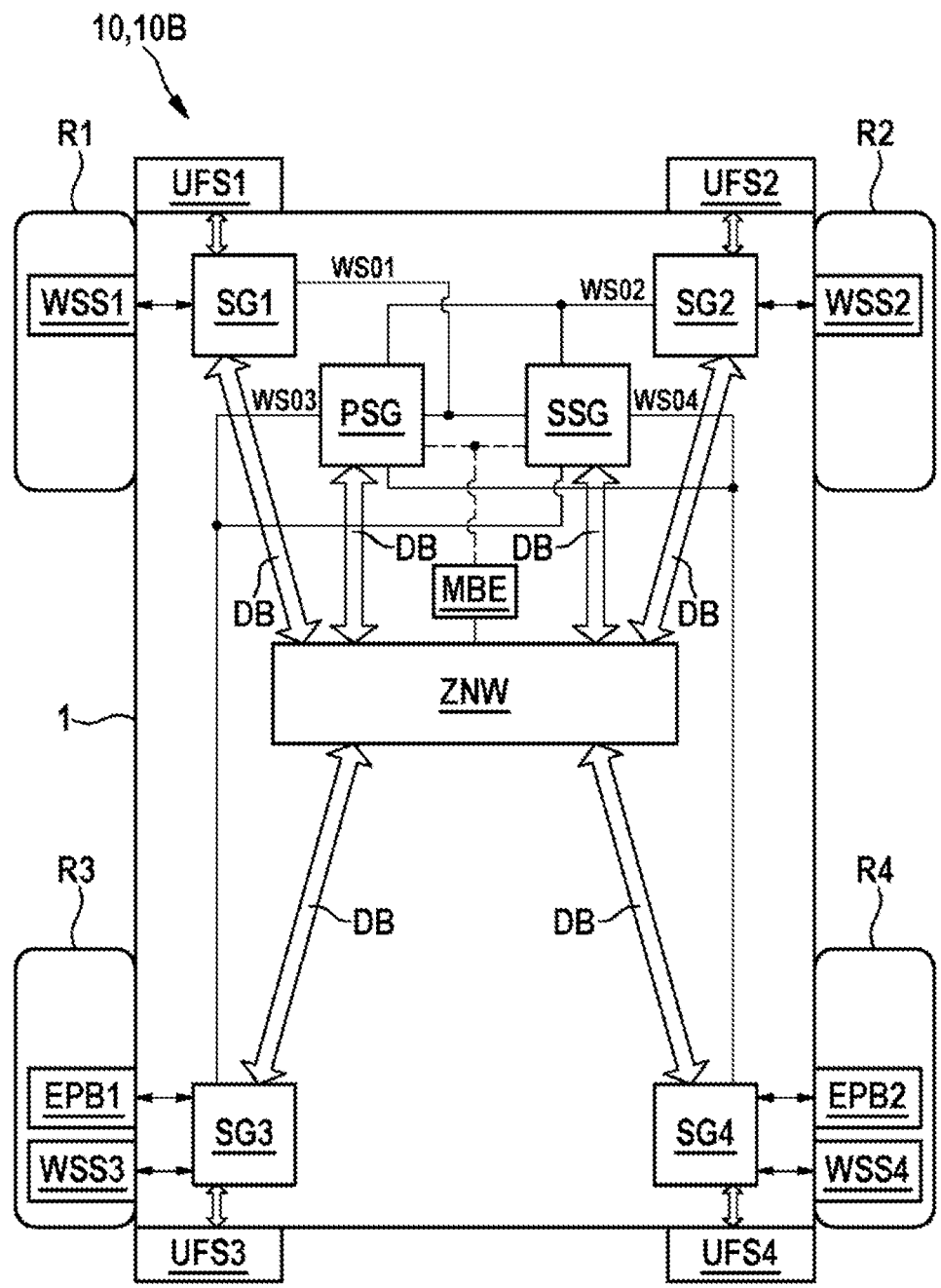
FIG. 2 shows a schematic block diagram of another exemplary embodiment of a sensor assembly according to the disclosure for a vehicle.

As can be seen from FIGS. 1 and 2, the illustrated exemplary embodiments of a sensor assembly 10, 10A, 10B according to the disclosure for a vehicle 1 each comprise a rotation rate sensor WSS1, WSS2, WSS3, WSS4 for each vehicle wheel R1, R2, R3, R4, each comprising at least one rpm-dependent and/or rotation-speed-dependent physical variable of the corresponding vehicle wheel R1, R2, R3, R4, wherein the at least one rpm-dependent and/or rotation-speed-dependent physical variable can be used to ascertain rotation rate information WSO1, WSO2, WSO3, WSO4 for the corresponding vehicle wheel R1, R2, R3, R4. In addition, the sensor assembly 10, 10A, 10B comprises a primary control unit PSG, which analyses the rotation rate information WSO1, WSO2, WSO3, WSO4 ascertained from the individual vehicle wheels R1, R2, R3, R4 to perform first braking functions of the vehicle 1, and a secondary control unit SSG, which evaluates the rotation rate information WSO1, WSO2, WSO3, WSO4 ascertained from the individual vehicle wheels R1, R2, R3, R4 to perform second braking functions of the vehicle 1. In each case, a control unit SG1, SG2, SG3, SG4 near the wheel is arranged in the region of the vehicle wheels R1, R2, R3, R4, which is directly connected to the assigned rotation rate sensor WSS1, WSS2, WSS3, WSS4 of the corresponding vehicle wheel R1, R2, R3, R4 and receives a sensor signal from the rotation rate sensor WSS1, WSS2, WSS3, WSS4 and ascertains the rotation rate information WSO1, WSO2, WSO3, WSO4 for the corresponding vehicle wheels R1, R2, R3, R4 from the sensor signal. At least the primary control unit PSG and at least one additional control unit receive the ascertained rotation rate information WSO1, WSO2, WSO3, WSO4 for analysis in real time. In addition, the control units SG1, SG2, SG3, SG4 near the wheel provide the rotation rate information WSO1, WSO2, WSO3, WSO4 over the databus DB to a central network ZNW as first sensor data for distribution in the vehicle 1.

As can be further seen from FIGS. 1 and 2, in the exemplary embodiments shown, four control units SG1, SG2, SG3, SG4 located near the wheel are each arranged in a corner region of the vehicle 1. Of these, in the region of a first vehicle wheel R1, which corresponds to a front wheel arranged on the left-hand side of the vehicle, a first rotation rate sensor WSS1 and a first control unit SG1 near the wheel are arranged. In the region of a second vehicle wheel R2, which corresponds to a front wheel arranged on the right-hand side of the vehicle, a second rotation rate sensor WSS2 and a second control unit SG2 near the wheel are arranged. In the region of a third vehicle wheel R3, which corresponds to a rear wheel located on the left-hand side of the vehicle, a third rotation rate sensor WSS3 and a third control unit SG3 near the wheel are arranged. In the region of a fourth vehicle wheel R4, which corresponds to a rear wheel arranged on the right-hand side of the vehicle, a fourth rotation rate sensor WSS4 and a fourth control unit SG4 near the wheel are arranged. The individual rotation rate information items WSO1, WSO2, WSO3, WSO4 are determined in the exemplary embodiment shown by scanning a magnetic encoder, not shown in detail, which is designed, for example, as a measuring encoder ring with a plurality of magnet elements, in particular permanent magnets, evenly distributed over its circumference. By means of the individual rotation rate sensors WSS1, WSS2, WSS3, WSS4, the magnetic fields of the magnet elements during a rotation of the measuring encoder ring are detected, wherein depending on the magnetic flux of the respective magnetic field detected, an output current is provided to the corresponding control unit SG1, SG2, SG3, SG4 near the wheel by means of a current interface for further use as rotation rate information WSO1, WSO2, WSO3, WSO4. To ascertain the rotation rate information WSO1, WSO2, WSO3, WSO4, the rotation rate sensors detect zero crossings of magnetic pole pairs, wherein at each magnetic pole pair zero crossing a so-called "speed pulse" is generated, i.e. a sign change of the detected magnetic field strength, which represents the actual rotation rate information WSO1, WSO2, WSO3, WSO4. In addition, via the AK-protocol used, additional rotation rate information, such as direction of rotation information, air gap information, temperature information, etc. can be transmitted to the corresponding control unit SG1, SG2, SG3, SG4 near the wheel as a data word with multiple protocol bits.

As can be further seen from FIGS. 1 and 2, the individual rotation rate sensors WSS1, WSS2, WSS3, WSS4 are each electrically connected to the corresponding control unit SG1, SG2, SG3, SG4 near the wheel via a two-wire conductor.

The individual control units SG1, SG2, SG3, SG4 near the wheels are electrically connected, in each case via a single-wire conductor, to the primary control unit PSG and to the at least one additional control unit, which in the illustrated exemplary embodiments is the secondary control unit SSG. Therefore, in the illustrated exemplary embodiments the primary control unit PSG and the secondary control unit SSG each receive the rotation rate information WSO1, WSO2, WSO3, WSO4 in real time for further analysis and to perform the first and second braking functions or to perform the primary stabilization of the vehicle, or the secondary stabilization of the vehicle in an emergency if the primary stabilization has failed. In order to perform the first braking functions and the primary stabilization of the vehicle, the primary control unit PSG controls a corresponding primary actuator system, which is known per se and not described in more detail, via which a pressure build-up or pressure relief in the wheel brakes can be performed in the braking system and corresponding open-loop and/or closed-loop control processes can be carried out. In order to perform the second braking functions and the secondary stabilization of the vehicle, the secondary control unit SSG controls a corresponding secondary actuator system, which is known per se and not described in more detail, via which a pressure build-up or pressure relief in the wheel brakes can be performed in the braking system and corresponding open-loop and/or closed-loop control processes can be carried out. The additional rotation rate information items of the individual rotation rate sensors WSS1, WSS2, WSS3, WSS4 are provided by the control units SG1, SG2, SG3, SG4 near the wheels, in each case with the determined rotation rate information WSO1, WSO2, WSO3, WSO4, over the databus DB to the central network ZNW as first sensor data for distribution in the vehicle 1.

As can be further seen from FIG. 2, the illustrated exemplary embodiment of the sensor assembly 10B comprises a parking brake function in addition to the exemplary embodiment of the sensor assembly 10A shown in FIG. 1. To perform the parking brake function, at least two of the control units SG1, SG2, SG3, SG4 located near the wheels are electrically connected to a corresponding actuator, not shown in detail, of an electric parking brake EPB1, EBP2 via an electrical connection. In the exemplary embodiment shown the third control unit SG3 near the wheel, which is arranged in the region of the third vehicle wheel R3, which corresponds to the rear wheel located on the left side of the vehicle, and the fourth control unit SG4 arranged in the region of the fourth vehicle wheel R4, which corresponds to the rear wheel located on the right side of the vehicle, are each electrically connected to the actuator of the corresponding electric parking brake. In this case, the third control unit SG3 near the wheel generates control signals for a first electric parking brake EPB1 arranged on the third vehicle wheel R3. The fourth control unit SG3 near the wheel generates control signals for a second electric parking brake EBP2 arranged on the fourth vehicle wheel R4. The generated control signals are then output to the corresponding actuators via the corresponding electrical connections. In the exemplary embodiment shown, the parking brake function in the two control units SG3, SG4 near the wheels is activated via second sensor data, which is transmitted over the central network ZNW to the two control units SG3, SG4 near the wheels. Of course, in an alternative exemplary embodiment not shown, in addition to the control units SG3, SG4 near the wheels on a rear axle, the control units SG1, SG2 near the wheels can also be implemented on a front axle to perform the parking brake function.

As can be further seen from FIG. 2, the illustrated exemplary embodiment of the sensor assembly 10B comprises a manual operating element MBE of the parking brake function, which is electrically connected to the central network ZNW. This means that the central network ZNW detects an operation of the manual operating element MBE and generates a corresponding activation signal and outputs it over the databus DB to the control units SG3, SG4 near the wheels. As the dashed lines indicate, the manual operating element MBE can additionally or alternatively be electrically connected to the primary control unit PSG or to the at least one additional control unit, in this case the secondary control unit SSG. In addition, in highly autonomous or highly automated vehicles 1 which are designed without driver intervention, the manual operating element MBE can be omitted since the parking brake function is activated automatically in that case. In the exemplary embodiment shown, the parking brake function is activated in the two control units SG3, SG4 near the wheels via second sensor data, which is transmitted over the central network ZNW and the databus DB to the two control units SG3, SG4 near the wheels.

As can be further seen from FIGS. 1 and 2, the control units SG1, SG2, SG3, SG4 near the wheels are electrically connected in each case to at least one environment sensor UFS1, UFS2, UFS3, UFS4, which detects at least one accident-relevant physical variable and transmits a corresponding sensor signal to the corresponding control unit SG1, SG2, SG3, SG4 near the wheel. In the exemplary embodiments shown, the first control unit SG1 near the wheel is connected to a first environment sensor UFS1, which monitors a left frontal vehicle environment. The second control unit SG2 near the wheel is connected to a second environment sensor UFS2, which monitors a right frontal vehicle environment. The third control unit SG3 near the wheel is connected to a third environment sensor UFS3, which monitors a left rear vehicle environment. The fourth control unit SG4 near the wheel is connected to a fourth environment sensor UFS4, which monitors a right rear vehicle environment. In the exemplary embodiments shown, the environment sensors UFS1, UFS2, UFS3, UFS4 are designed as ultrasonic sensors. Alternatively, the environment sensors UFS1, UFS2, UFS3, UFS4 can also be designed as radar sensors, optical sensors, etc. Using the environment sensors UFS1, UFS2, UFS3, UFS4, corresponding vehicle safety systems can determine a distance between the vehicle 1 and objects in the vehicle environment. This distance information can be used in driver assistance systems, for example, such as a parking assistant, a distance warning device, a cruise control system, etc. The control units SG1, SG2, SG3, SG4 located near the wheels provide the sensor signals of the environment sensors UFS1, UFS2, UFS3, UFS4 over the databus DB to the central network ZNW as third sensor data for distribution in the vehicle 1. For the redundant power supply, the control units SG1, SG2, SG3, SG4 located near the wheels are each electrically connected to a first power supply, not shown in detail, of the vehicle 1 and to a second power supply EV2 of the vehicle 1, which is independent of the first power supply and not shown in detail.

In addition or alternatively, a drive control unit which controls an inverter of an electric drive of the vehicle 1, and/or a central control unit which calculates motion trajectories, as the at least one additional control unit can be electrically connected to the control units SG1, SG2, SG3, SG4 near the wheels via a direct cable connection and the rotation rate information WSO1, WSO2, WSO3, WSO4 can be received and analyzed in real time.

Since the preferred installation position of the primary control unit PSG is located in the front left-hand edge region of the vehicle 1, in an exemplary embodiment of the sensor assembly 10 according to the disclosure not shown, the primary control unit PSG is designed as a first control unit SG1 near the wheel and directly connected to the first rotation rate sensor WSS1. In this exemplary embodiment, the primary control unit PSG provides the first rotation rate information WSO1 to the at least one additional control unit via a point-to-point connection in real time. In addition, the primary control unit PSG provides the first rotation rate information WSO1 and the additional rotation rate information of the first rotation rate sensor WSS1 over the databus DB to the central network ZNW for distribution in the vehicle 1. Since the preferred installation position of the secondary control unit SSG is located in the front right-hand edge region of the vehicle 1, the secondary control unit SSG in this exemplary embodiment, not shown, is designed as a second control unit SG2 near the wheel and is directly connected to the second rotation rate sensor WSS2. Therefore, the secondary control unit SSG provides the second rotation rate information WSO2 at least to the primary control unit PSG and, if necessary, to at least one additional control unit via a point-to-point connection in real time. In addition, the secondary control unit SSG provides the second rotation rate information WSO2 and the additional rotation rate information of the second rotation rate sensor WSS2 over the databus DB to the central network ZNW for distribution in the vehicle 1.

The described exemplary embodiments of the sensor assembly 10 according to the disclosure for a vehicle 1, which detects at least one rpm-dependent and/or rotation-speed-dependent physical variable of the vehicle wheels R1, R2, R3, R4, is preferably used in a multi-circuit braking system, in particular for a highly automated or autonomous vehicle 1. Such a multi-circuit braking system comprises a plurality of wheel brakes, each arranged on a vehicle wheel R1, R2, R3, R4, a primary control unit PSG, which analyses the rotation rate information WSO1, WSO2, WSO3, WSO4 ascertained from the individual vehicle wheels R1, R2, R3, R4 in order to perform first braking functions of the vehicle 1, and a secondary control unit SSG, which analyses the rotation rate information WSO1, WSO2, WSO3, WSO4 ascertained from the individual vehicle wheels R1, R2, R3, R4 to perform second braking functions of the vehicle 1.

In this case, the primary control unit PSG can control an ESP system or an ESP system with a vacuum-independent electro-hydraulic servo-assisted braking system, or an integrated brake system (IPB). The secondary control unit SSG can control a vacuum-independent electro-hydraulic servo-assisted braking system or a redundant brake unit.

The invention claimed is:

1. A sensor assembly for a vehicle, the sensor assembly comprising:
   a rotation rate sensor for each respective vehicle wheel of the vehicle, each of the rotation rate sensors being configured to detect at least one physical variable of the respective vehicle wheel that is at least one of rpm-dependent and rotational-speed-dependent, the physical variable being used to ascertain rotation rate information for the respective vehicle wheel;
- a primary controller configured to analyze the rotation rate information ascertained for each of the respective vehicle wheels and to perform first braking functions of the vehicle based on the rotation rate information;
- a secondary controller configured to analyze the rotation rate information ascertained for each of the respective vehicle wheels and to perform second braking functions of the vehicle based on the rotation rate information; and
- a respective controller corresponding to each of the respective vehicle wheels, each of the respective controllers being directly connected to the corresponding rotation rate sensor of the respective vehicle wheel and being configured to receive a sensor signal from the corresponding rotation rate sensor and determine the rotation rate information for the respective vehicle wheel from the sensor signal, each of the respective controllers being configured to provide the rotation rate information to a central network over a databus for distribution in the vehicle, each of the respective controllers being configured to provide the rotation rate information directly to the primary controller and the secondary controller via a point-to-point connection, wherein at least two of the respective controllers corresponding to the respective vehicle wheels are each electrically connected via an electrical connection to a corresponding actuator of an electric parking brake configured to carry out a parking brake function, the parking brake function being activated in the at least two of the respective controllers corresponding to the respective vehicle wheels via sensor data which is transmitted over the central network and the databus to the at least two of the respective controllers corresponding to the respective vehicle wheels.

2. The sensor assembly as claimed in claim 1, wherein each of the rotation rate sensors are electrically connected to the respective controller corresponding to the respective vehicle wheel via a respective two-wire conductor.

3. The sensor assembly as claimed in claim 1, wherein the respective controllers corresponding to the respective vehicle wheels are configured to provide additional rotation rate information over the databus and the central network for distribution in the vehicle, the additional rotation rate information being of a different type than the rotation rate information.

4. The sensor assembly as claimed in claim 1, wherein the at least two of the respective controllers corresponding to the respective vehicle wheels each generate control signals and output the control signals via the electrical connection to the corresponding actuator of the electric parking brake.

5. The sensor assembly as claimed in claim 1, wherein a manual operating element of the parking brake function is electrically connected to one of (i) the primary controller, (ii) at least one additional controller, and (iii) the central network.

6. The sensor assembly as claimed in claim 1, wherein the at least two of the respective controllers corresponding to the respective vehicle wheels are arranged on a common vehicle axle.

7. The sensor assembly as claimed in claim 1, wherein the primary controller and one of the respective controllers corresponding to the wheel are implemented by shared hardware.

8. The sensor assembly as claimed in claim 1, wherein the respective controllers corresponding to the respective vehicle wheels are each electrically connected to an environment sensor configured to detect at least one accident-relevant physical variable and transmit a corresponding sensor signal to the respective controller corresponding to the respective vehicle wheel.

9. The sensor assembly as claimed in claim 8, wherein the respective controllers corresponding to the respective vehicle wheels provide the sensor signals of the environment sensors over the databus to the central network as third sensor data for distribution in the vehicle.

10. The sensor assembly as claimed in claim 1, wherein the respective controllers corresponding to the respective vehicle wheels each have a redundant power supply.

11. The sensor assembly as claimed in claim 1, wherein at least one additional controller is connected to the central network, the at least one additional controller including at least one of (i) a drive controller configured to drive an inverter of an electric drive of the vehicle, and (ii) a central controller configured to calculate motion trajectories.

12. The sensor assembly as claimed in claim 1, wherein the primary controller is configured to control one of (i) an ESP system and (ii) an ESP system with a vacuum-independent electro-hydraulic servo-assisted braking system.

13. The sensor assembly as claimed in claim 1, wherein the secondary controller is configured to control one of (i) a vacuum-independent electro-hydraulic brake booster and (ii) a redundant brake unit.

14. A multi-circuit braking system for a vehicle, the multi-circuit braking system comprising:
- a plurality of wheel brakes each arranged on a vehicle wheel of the vehicle;
- a sensor assembly configured to detect at least one physical variable of corresponding wheels that is at least one of rpm-dependent and rotational-speed-dependent;
- a primary controller configured to analyze rotation rate information ascertained for each of the respective vehicle wheels to perform first braking functions of the vehicle;
- a secondary controller configured to analyze the rotation rate information ascertained for each of the respective vehicle wheels to perform second braking functions of the vehicle; and wherein the sensor assembly includes (i) a rotation rate sensor for each vehicle wheel of the vehicle, each of the rotation rate sensors being configured detect the at least one physical variable of the respective vehicle wheel, the physical variable being used to the ascertain rotation rate information for the respective vehicle wheel and (ii) a respective controller corresponding to each of the respective vehicle wheels, each of the respective controllers being directly connected to the corresponding rotation rate sensor of the respective vehicle wheel and being configured to receive a sensor signal from the corresponding rotation rate sensor and determine the rotation rate information for the respective vehicle wheel from the sensor signal, each of the respective controllers being configured to provide the rotation rate information to a central network over a databus for distribution in the vehicle, each of the respective controllers being configured to provide the rotation rate information directly to the primary controller and the secondary controller via a point-to-point connection, wherein at least two of the respective controllers corresponding to the respective vehicle wheels are each electrically connected via an electrical connection to a corresponding actuator of an electric parking brake configured to carry out a parking brake function, the parking brake function being activated in the at least two of the respective controllers corresponding to the respective vehicle wheels via sensor data which is transmitted over the central network and the databus to the at least two of the respective controllers corresponding to the respective vehicle wheels.

15. The multi-circuit braking system as claimed in claim 14, where the vehicle is an autonomous vehicle.

* * * * *